(12) United States Patent
Dettenberger et al.

(10) Patent No.: US 9,145,950 B2
(45) Date of Patent: Sep. 29, 2015

(54) SUB-ASSEMBLY FOR AN ELECTROMECHANICAL BRAKE ACTUATOR

(75) Inventors: Stefan Dettenberger, Ansbach (DE); Gregor Poertzgen, Koblenz (DE)

(73) Assignees: Lucas Automotive GmbH, Koblenz (DE); Oechsler AG, Ansbach (DE)

( * ) Notice: Subject to any disclaimer, the term of this patent is extended or adjusted under 35 U.S.C. 154(b) by 25 days.

(21) Appl. No.: 13/811,486

(22) PCT Filed: Jul. 4, 2011

(86) PCT No.: PCT/EP2011/003314
§ 371 (c)(1),
(2), (4) Date: Apr. 18, 2013

(87) PCT Pub. No.: WO2012/010256
PCT Pub. Date: Jan. 26, 2012

(65) Prior Publication Data
US 2013/0203554 A1    Aug. 8, 2013

(30) Foreign Application Priority Data
Jul. 23, 2010    (DE) .......................... 10 2010 032 053

(51) Int. Cl.
*F16H 48/06*    (2006.01)
*F16H 1/28*    (2006.01)
(Continued)

(52) U.S. Cl.
CPC    *F16H 1/28* (2013.01); *F16D 65/28* (2013.01); *F16D 2121/24* (2013.01); *F16D 2125/34* (2013.01); *F16D 2125/48* (2013.01); *F16D 2125/50* (2013.01)

(58) Field of Classification Search
CPC .............. F16H 37/041; F16D 2121/24; F16D 2125/40; F16D 2125/50; F16D 2125/48; H02K 7/116
USPC .................................................. 475/149, 343
See application file for complete search history.

(56) References Cited

U.S. PATENT DOCUMENTS

| 7,008,348 B2 | 3/2006 | LaBath |
| 7,325,658 B2 | 2/2008 | Halasy-Wimmer et al. |

(Continued)

FOREIGN PATENT DOCUMENTS

| CN | 101031459 A | 9/2007 |
| CN | 101530906 A | 9/2009 |

(Continued)

OTHER PUBLICATIONS

Chinese Search Report, Application No. 201180045035.1 dated Nov. 10, 2014.

*Primary Examiner* — Dirk Wright
(74) *Attorney, Agent, or Firm* — MacMillan, Sobanski & Todd, LLC

(57) ABSTRACT

The invention relates to a subassembly for a brake actuator, which is provided for an electromechanically operated parking brake. The subassembly comprises a drive device and a gearing device, which comprises in succession a first, second and third gear stage for transmitting a torque generated by the drive device. The first gear stage is designed in the form of a gearwheel or belt drive, the second gear stage is designed in the form of a gearwheel mechanism, and the third gear stage is designed in the form of a planetary gear, wherein a planet carrier of the third gear stage receives a first gearing shaft for a sun gear of the planetary gear and an output-side gearwheel of the second gear stage that is coupled to rotate with the sun gear, and bearing elements for planet gears of the third gear stage. The invention further relates to an electromechanical brake actuator and to an electric parking brake, which include the sub-assembly.

18 Claims, 4 Drawing Sheets

(51) Int. Cl.
*F16D 65/28* (2006.01)
*F16D 121/24* (2012.01)
*F16D 125/34* (2012.01)
*F16D 125/48* (2012.01)
*F16D 125/50* (2012.01)

(56) References Cited

U.S. PATENT DOCUMENTS

| | | | |
|---|---|---|---|
| 8,105,200 B2 | 1/2012 | Dettenberger et al. | |
| 8,137,230 B2 | 3/2012 | Omura et al. | |
| 8,596,426 B2* | 12/2013 | Yamasaki et al. | 188/162 |
| 8,753,082 B2* | 6/2014 | Fuglsang-Petersen et al. | 416/61 |
| 8,770,263 B2 | 7/2014 | Hanna et al. | |
| 2005/0064980 A1* | 3/2005 | Hoshi | 475/257 |
| 2007/0213171 A1* | 9/2007 | Pizzichil et al. | 475/331 |
| 2012/0325601 A1* | 12/2012 | Giering | 188/162 |

FOREIGN PATENT DOCUMENTS

| | | |
|---|---|---|
| DE | 102004012355 A1 | 9/2004 |
| DE | 102004048700 A1 | 5/2006 |
| DE | 102005021767 A1 | 9/2006 |
| DE | 102006040129 A1 | 1/2008 |
| EP | 2068036 A1 | 6/2009 |
| JP | 2002250408 A | 9/2002 |
| WO | 2006094804 A1 | 9/2006 |

* cited by examiner

SUB-ASSEMBLY FOR AN ELECTROMECHANICAL BRAKE ACTUATOR

CROSS-REFERENCE TO RELATED APPLICATIONS

This application is a national stage of International Application No. PCT/EP2011/003314 filed Jul. 4, 2011, the disclosures of which are incorporated herein by reference in entirety, and which claimed priority to German Patent Application No. DE 10 2010 032 053.6 filed Jul. 23, 2010, the disclosures of which are incorporated herein by reference in entirety.

BACKGROUND OF THE INVENTION

The present invention relates to the field of motor-vehicle brakes. More precisely, the invention relates to an improved structure of a subassembly of a brake actuator that has been provided for an electromechanically operated parking brake or an electromechanically operated service brake.

Electrically operated parking brakes (EPB) are increasingly replacing conventional parking brakes, which via cables convert a force applied by the driver into a locking force at wheel brakes of the vehicle. The advantage of electric parking brakes lies in their capacity to be driven by modern on-board electronics. As a result, new application options for the parking brake are opened up, such as, for example, the realisation of a hill-start assist (hill-hold function).

An electrically operated parking brake includes, as a rule, an electromechanical brake actuator which exerts a locking force at the wheel brakes via a mechanically displaceable brake piston. The brake actuator is substantially defined by a subassembly, including motor devices and gearing devices, that has been supported in cushioning manner in a housing and has been accommodated in the interior of a vehicle wheel.

A particular challenge now consists in constructing a high-performance, low-wear and, at the same time, spatially compact electromechanical brake actuator, in order to save weight and space. With a view to enhancing performance, in this connection a multi-stage gearing is frequently employed, in order to obtain a considerable gear reduction of the rotational motion generated by the electric motor (a typical gear-reduction value is 120:1). With increasing complexity of the gearing, however, the wear potential of the brake actuator rises, by virtue of which, in turn, the service life of the brake actuator is impaired.

From patent application DE 10 2004 048 700 A1 an electromechanical brake actuator is known that exhibits an electric motor and a three-stage gearing device. The gearing device includes two successive toothed-wheel gearing stages, downstream of which on the output side a planetary gearing stage has been connected. Furthermore, two gearing shafts, supported on one side of a carrier element, for the support of the two toothed-wheel gearing stages and of a sun gear of the planetary gearing stage have been provided.

The construction and stable mechanical support of the gearing components is crucial, in order, on the one hand, to reduce the volume of the brake actuator and, on the other hand, to extend its service life. For example, an inadequate support of greatly loaded gearing components may intensify the wear in the gearing, by virtue of which the service life and the efficiency of the brake actuator decline.

BRIEF SUMMARY OF THE INVENTION

A feature underlying the invention is to specify an improved structure for an electromechanical brake actuator that has been optimised with respect to the support of the gearing components and with respect to the construction space.

For this purpose a subassembly for an electromechanical brake actuator is provided, said subassembly comprising a drive device for generating a torque and a gearing device for transmitting the torque. The gearing device comprises, in succession, a first, second and third gearing stage, the second gearing stage taking the form of a toothed-wheel gearing, and the third gearing stage taking the form of a planetary gearing, and a planet carrier of the third gearing stage receiving a first gearing shaft for a sun gear of the third gearing stage and an output-side gearwheel, coupled to rotate with the sun gear, of the second gearing stage, as well as bearing elements for planet gears of the third gearing stage.

According to a first embodiment, the first gearing stage may take the form of a toothed-wheel gearing. In this case an output-side gearwheel of the first gearing stage may be in meshing engagement with a drive-side gearwheel that has been mounted on a drive shaft of the drive device. In an alternative embodiment, the first gearing stage may take the form of a belt gearing, the transfer of torque being effected by a toothed belt that has been clamped between a drive-side belt pulley on the drive shaft and an output-side belt pulley of the first gearing stage.

The output-side gearwheel or belt pulley of the first gearing stage may have been arranged concentrically with a drive-side gearwheel of the second gearing stage and may have been connected thereto in torsionally resistant manner. According to a further embodiment, the output-side gearwheel or belt pulley of the first gearing stage may have been integrally formed with the drive-side gearwheel of the second gearing stage. The drive-side gearwheel of the second gearing stage may, in turn, be in meshing engagement with an output-side gearwheel of the second gearing stage. As an alternative to this, the drive-side gearwheel of the second gearing stage may have been coupled with the output-side gearwheel of the second gearing stage via an intermediate gear.

The output-side gearwheel of the second gearing stage may have been connected to rotate with a sun gear of the third gearing stage taking the form of a planetary gearing. The sun gear may have been arranged concentrically with the output-side gearwheel of the second gearing stage. As an alternative to this, the sun gear may have been integrally formed with the output-side gearwheel of the second gearing stage. The advantage of an integral design lies in a lessening of gearing components, by virtue of which the mounting is facilitated and the service life of the subassembly is increased.

The receiving of the first gearing shaft by the planet carrier may be effected in torsionally resistant or rotatable manner. Accordingly, the first gearing shaft may have been connected to the planet carrier in torsionally resistant manner. The planet carrier and the first gearing shaft may have been formed in one piece or in two pieces. In a further embodiment, the first gearing shaft may have been supported in torsionally resistant manner on or in the planet carrier.

The planet carrier may be disc-shaped. The disc-shaped planet carrier may receive the first gearing shaft centrally on a side on which the bearing elements for the reception of the planet gears have been formed. The first gearing shaft received on or in the planet carrier may extend into space along the axis of rotation of the planet carrier. By virtue of the direct reception of the first gearing shaft on the planet carrier, the sun gear and the output-side gearwheel, connected thereto in torsionally resistant manner, of the second gearing stage, on the one hand, and the planet gears, on the other hand, are able to rest on the planet carrier. In this way, the planet gears and the sun gear can be supported on the planet carrier jointly and in a fixed spatial relationship to one another.

On the back of the planet carrier an output element for delivering the torque may have been arranged in torque-transmitting manner. The output-side element may be peg-shaped and arranged concentrically with the planet carrier. According to one embodiment, the output element, the planet carrier and the first gearing shaft may have been integrally formed.

Furthermore, the subassembly may include a fixing element that has been provided for arranging the gearing device spatially relative to the drive device. According to an alternative embodiment, the fixing element may have been formed as a carrier element on which the drive device and the gearing device have been combined to form an independent subassembly which is capable of being separately manipulated. As a result, all the components of the subassembly can be arranged spatially with respect to one another on the carrier element and can be fastened thereto. In one implementation of this aspect, no gearing components rest on a housing of the brake actuator, by virtue of which the mounting, stability and efficiency of the subassembly are improved.

Components of the gearing device may have been formed on the fixing element. For example, a ring gear and/or a second gearing shaft may have been formed on or in the fixing element. In one embodiment, the ring gear and/or the second gearing shaft may have been integrally formed with the fixing element. The integration of gearing components on the fixing element results in a lessening of the number of gearing components to be mounted, by virtue of which not only is the mounting simplified but the service life of the brake actuator is also increased. By integration of gearing components that are greatly loaded in operation—such as, for example, the ring gear of the planetary gearing—mechanical connections are eliminated that may loosen with the passage of time by virtue of considerable loading.

By suitable configuration of the fixing element, furthermore the construction space of the subassembly can be optimised. In one embodiment, the fixing element may have been constructed in stepped manner, whereby the ring gear that is formed at a first end of the fixing element has been lowered to a receiving space defined in the form of a cylinder at the second end of the fixing element. As a result, the output-side gearing components can be displaced in the axial direction relative to the drive device, by virtue of which the dimension of the subassembly in the axial direction is reduced.

Furthermore, the subassembly may include a centring element. The centring element may be capable of being fastened to the fixing element. The centring element may have been formed in such a manner that, together with the fixing element, it defines a cage-like receiving space in which gearing components of the gearing device have been received in protective manner.

The centring element may furthermore include bearings that have been provided for the support of the first and second gearing shafts on the centring element. Both gearing shafts may also be received (in rotatable or torsionally resistant manner) on both sides, whereby the first gearing shaft has been received at its first end on the fixing element and at its second end on the planet carrier, and the second gearing shaft has been received at its first end on the fixing element and at its second end on the centring element. A bilateral reception of the gearing shafts has the advantage that radially acting forces are distributed on the gearing shafts, by virtue of which deformations of the gearing shafts in the axial direction are prevented.

The brake actuator may further include a holding element that has been provided for supporting the planet carrier, with the planet gears resting thereon, rotatably in the ring gear. The holding element may have been formed as a simple ring which is capable of being fastened to the underside of the ring gear in exactly fitting manner. In this way, the planet carrier can be prevented from falling out of the ring gear.

The invention further provides an electromechanical brake actuator that comprises the subassembly described above, a housing and at least two cushioning elements, wherein the at least two cushioning elements have been arranged between the subassembly and the housing for the purpose of cushioning support of the subassembly in the housing.

The at least two cushioning elements can be mounted on a fixing element of the subassembly, in which case the subassembly rests on a lower part of the housing via the cushioning elements. The cushioning elements may be block-shaped, annular, O-ring-shaped, L-shaped or T-shaped. The cushioning elements may have been formed from elastomeric material having differing spring constants and damping constants. Furthermore, a drive device of the subassembly may be cushioned separately in relation to the lower part of the housing.

The invention further relates to an electric parking brake that includes the electromechanical brake actuator or the subassembly of the present invention as well as a rotation/translation converter connected downstream for transforming the rotational motion generated by the brake actuator into a linear motion.

Other advantages of this invention will become apparent to those skilled in the art from the following detailed description of the preferred embodiments, when read in light of the accompanying drawings.

DETAILED DESCRIPTION OF THE INVENTION

In the following an embodiment of a subassembly of an electromechanical brake actuator for an electrically operated parking brake will be elucidated. Matching elements in the Figures have been denoted by the same reference symbols. Statements such as 'upper side' and 'underside' refer to the orientation, shown in the Figures, of the assembly. It will be understood that the subassembly has been incorporated—as a rule, horizontally—within an electric parking brake.

Figure 1:
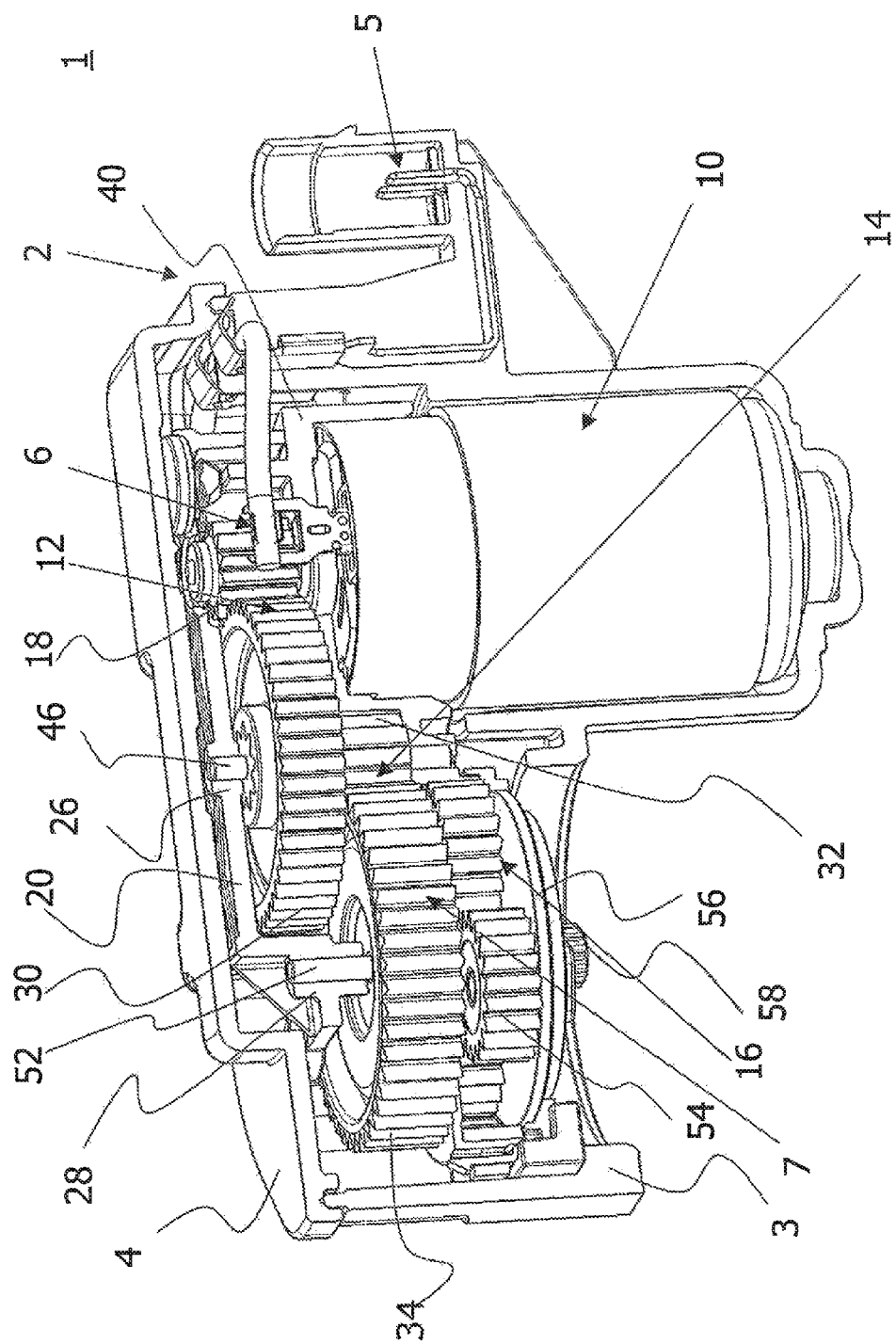
FIG. 1 is a perspective representation of an embodiment of an electromechanical brake actuator.

FIG. 1 shows, in a perspective representation, essential components of an embodiment of an electromechanical brake actuator 1. The electromechanical brake actuator 1 exhibits a subassembly 6 which has been supported in cushioning manner in a protective housing 2. The subassembly 6 comprises a drive device 10, with a drive shaft 11, and a gearing device 7 coupled therewith. The gearing device 7 has three successive stages, the first and second gearing stages 12, 14 taking the form of toothed-wheel gearings, and the third gearing stage 16 taking the form of a single-stage planetary gearing.

The housing 2 has been formed in two parts with a lower housing part 3 and an upper housing part 4. The lower housing part 3 serves for receiving the subassembly 6 and has therefore been adapted, as regards its spatial configuration, to the dimensions of the subassembly 6. Accordingly, the lower housing part 3 exhibits a cylindrical cavity in which an electric motor of the drive device 10 has been received. Furthermore, to the side of the cylindrical cavity an electrical plug-and-socket connector 5 with contact pins has been integrally formed, in order to supply the drive device 10 with electricity and to drive it. The upper housing part 2 is cover-shaped. In the present embodiment it mainly performs a protecting and sealing function. After incorporation of the subassembly 6 into the lower housing part 3, the lower housing part 3 is welded to the upper housing part 4.

Figure 2:
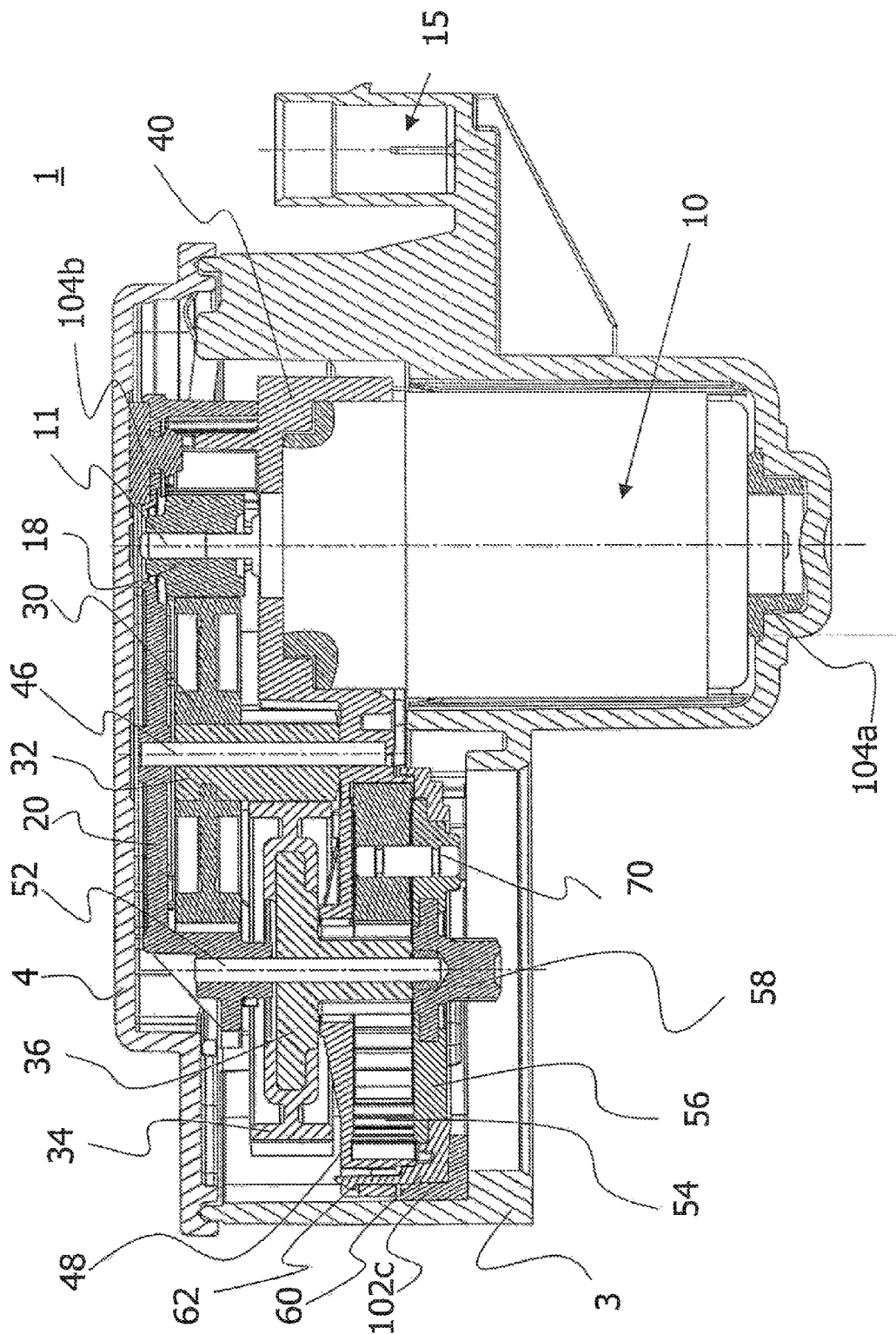
FIG. 2 is a sectional view of the assembly constituted by the electromechanical brake actuator according to FIG. 1.

The cushioning support of the subassembly 6 in the housing 2 has been represented more clearly in FIG. 2. The support of the subassembly 6 is effected via two or more cushioning elements 100a-b, 102a-c, 104a-b. In this case the electric motor has been supported in cushioning manner in relation to the lower housing part 3 by means of a cylindrical cushioning element 104a. At the same time, the gearing device 7 is supported in cushioning manner in the lower housing part 3 via two cushioning elements 100a-b fitted to the fixing element 40 and via three further cushioning elements 102a-c fitted to a holding element 60 of the gearing device 7. Three further, plug-shaped cushioning elements 104b have been provided for supporting the centring element 20 on the upper side in relation to the upper housing part 4. Each of the cushioning elements 100a-b, 102a-c, 104a-b has been constructed from an elastomeric synthetic material with given spring constant and damping constant, and has been shaped and dimensioned in such a manner that they cushion the subassembly 6 optimally at the corresponding support points in the housing 2.

Figure 3:
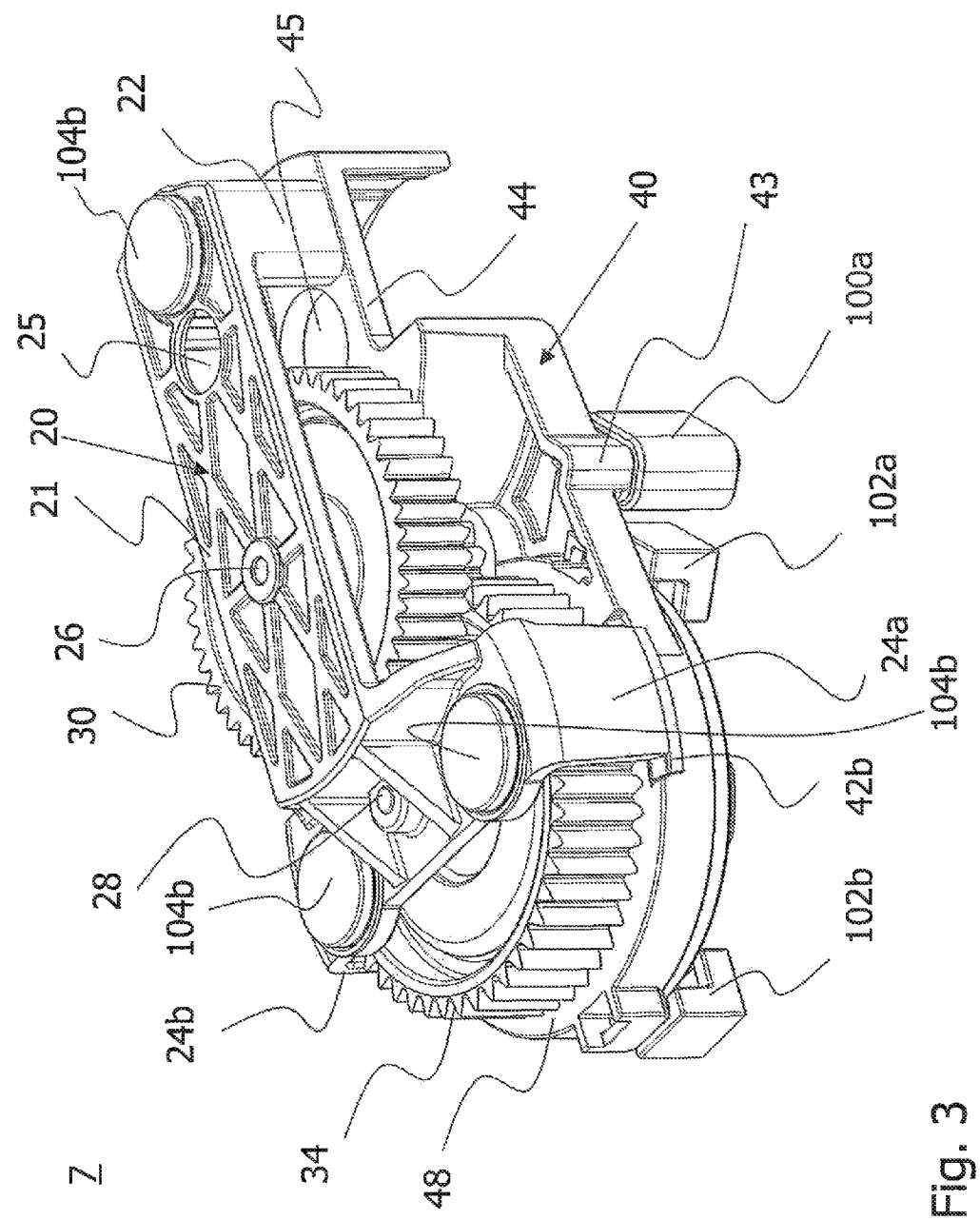
FIG. 3 is a perspective representation of a mounted gearing device of a subassembly of the electromechanical brake actuator according to FIG. 1.

FIG. 3 shows a perspective representation of the mounted gearing device 7. On the basis of FIG. 3, the arrangement of the gearing device 7 with respect to the fixing element 40 and with respect to a centring element 20 becomes apparent.

The centring element 20 exhibits a plate-like base 21, at one end of which on the underside a mechanical plug-and-socket connector 22, and at the other end of which on the underside two further mechanical plug-and-socket connectors 24a-b, spaced from one another, have been moulded on. The plug-and-socket connectors 22, 24a-b are arm-shaped and extend vertically downwards, starting from the underside of the centring element 20. Furthermore, two bearings 26, 28, spaced from one another, for upper-side reception of a first and second gearing shaft 46, 52, and also a circular opening 25, into which the drive shaft 11 of the drive device 10 protrudes in contactless manner, have been formed on the centring element 20.

The fixing element 40 is likewise plate-shaped and exhibits on its upper side three mechanical plug-and-socket connectors 42a-c, the spatial arrangement of the plug-and-socket connectors 42a-c corresponding to that of the plug-and-socket connectors 22, 24a-b of the centring element 20. By virtue of the mechanical plug-and-socket connectors 22, 24a-b, 42a-c, the centring element 20 has been connected to the fixing element 40 via a press fit, whereby over the length of the arm-shaped plug-and-socket connectors 22, 24a-b a vertical spacing between the upper side of the fixing element 40 and the underside of the centring element 20 is defined. In this way, the centring element 20 mechanically connected to the fixing element 40 forms a cage-like receiving space which has been provided for the reception and stable support of gearing components.

On the underside of the fixing element 40 two carrier elements 43 (in FIG. 3 only one carrier element is visible, by reason of the perspective representation) have been moulded on laterally, which extend vertically downwards and have been encased by the cushioning elements 100a-b. The carrier elements 43 surrounded by the cushioning elements 100a-b have been provided for supporting in cushioning manner the gearing device 7 assembled between the fixing element 40 and the centring means 20 in the housing 2 of the brake actuator 1.

Furthermore, the fixing element 40 has been designed to define the spatial position of the drive device 10 with respect to the gearing device 7. For this purpose, at the second end of the fixing element 40 on the underside a cylindrical receiving space 44 has been formed, in which the drive device 10 has been inserted (FIG. 1). A drive shaft 11 of the drive device 10, with a gearwheel 18 attached thereto, is capable of being passed through a circular opening 45 in the carrier element 40, so that a drive-side gearwheel 18 has been arranged in the receiving space between the centring element 20 and the fixing element 40 and is in engagement with an output-side gearwheel 30 of the first gearing stage 12.

In an alternative embodiment, the fixing element 40 has additionally been equipped with a fastening device for the drive device 10. In this case the drive device 10 is capable of being permanently mounted on the fixing element 40, so that by means of the fixing element 40 the drive device 10 and the gearing device 7 have been combined to form a subassembly 6 which is capable of being manipulated independently.

Figure 4:
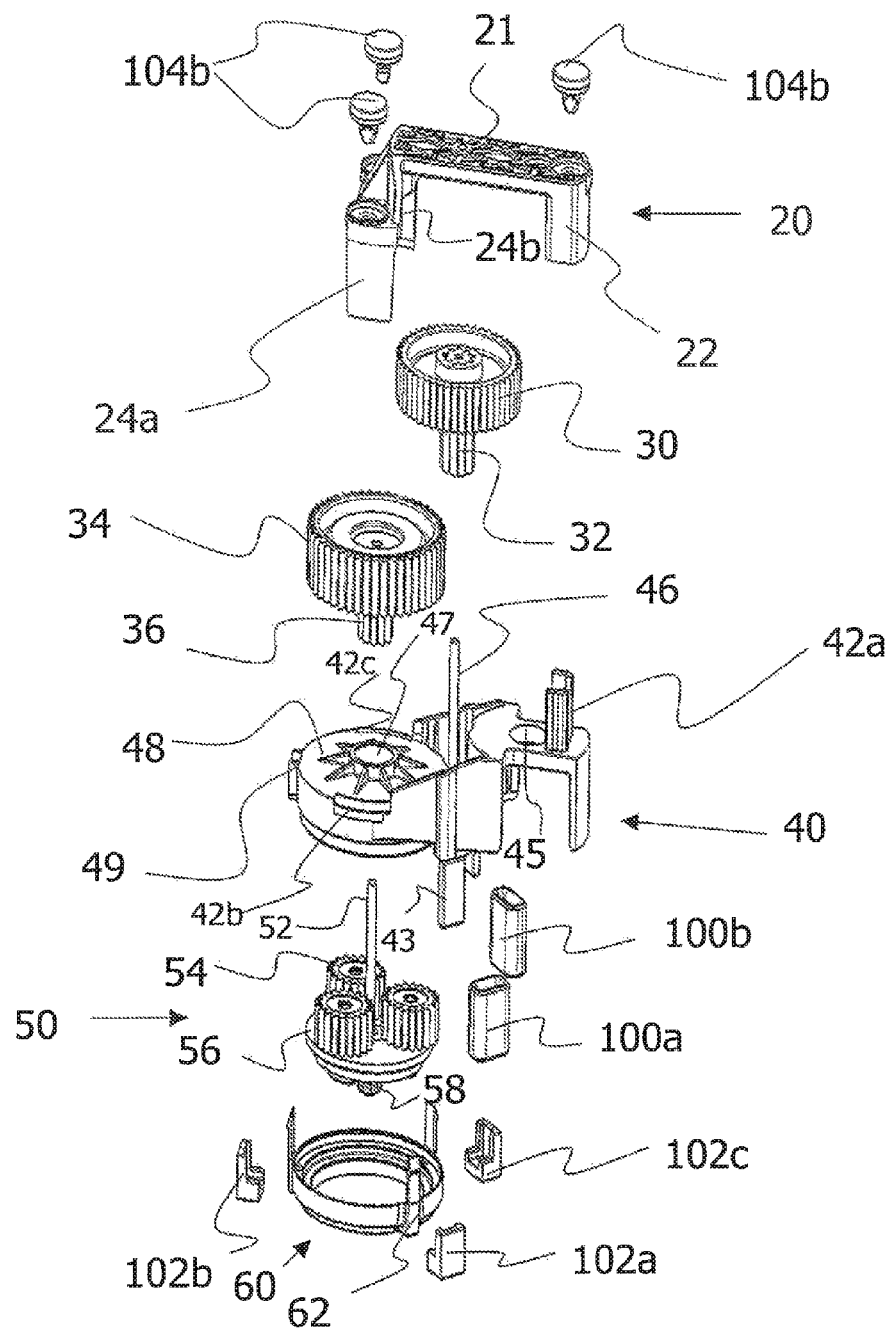
FIG. 4 is an exploded representation of the gearing device of the subassembly according to FIG. 2.

On the basis of FIGS. 2 and 4 the structure of the gearing device 7 will now be described in more detail. FIG. 4 illustrates, in the form of an exploded representation, the individual components of the gearing device 7 which comprises three gearing stages 12, 14, 16. FIG. 2 shows a sectional view of the electromechanical brake actuator 1.

The first gearing stage 12 takes the form of a toothed-wheel gearing, wherein the drive-side gearwheel 18 (FIG. 2) has been connected to the drive shaft 11 of the drive device 10 in torque-transmitting manner. The drive-side gearwheel 18 is in meshing engagement with an output-side gearwheel 30 of the first gearing stage 12. The output-side gearwheel 30 of the first gearing stage 12 has been connected to rotate with a drive-side gearwheel 32 of the second gearing stage 14. The second gearing stage 14 likewise comprises a toothed-wheel gearing which comprises two gearwheels 32, 34. The drive-side gearwheel 32 of the second gearing stage 14 meshes, in turn, with an output-side gearwheel 34 of the second gearing stage 14. On the output-side gearwheel 34 of the second gearing stage 14 a sun gear 36 of the third gearing stage 16 has been formed on the underside, concentrically with the output-side gearwheel 34 and to rotate with same. The sun gear 36 is part of the planetary gearing which forms the third gearing stage 16 of the gearing device 7.

The first and second gearing stages 12, 14 each comprise two engaged externally toothed gearwheels, whereby in each instance the output-side gearwheel 32, 36 exhibits a larger diameter and a higher number of teeth in comparison with the respective drive-side gearwheel 30, 34. In this way, a considerable gear reduction of the rotational motion generated at the drive device is obtained.

The output-side gearwheel 30 of the first gearing stage 12 exhibits a continuous axial bore into which the drive-side gearwheel 32 of the second gearing stage 14 has been inserted in torsionally resistant manner. The drive-side gearwheel 32 of the second gearing stage 14 further exhibits an axial bore for passing the second gearing shaft 46 through. The output-side gearwheel 34 of the second gearing stage 14 and the sun gear 36 connected thereto to rotate with same have been formed in the same way. The sun gear 36 likewise exhibits an axial bore for receiving the first gearing shaft 52.

The planetary gearing of the third gearing stage 16 has been formed in a single stage and has been connected downstream of the two toothed-wheel gearing stages 12, 14. Said planetary gearing includes a planet carrier 56 with the first gearing shaft 52 fitted thereto, three planet gears 54 of identical form, a ring gear 48 and the sun gear 36. The planet carrier 56 is disc-shaped. On its upper side the three planet gears 54 of identical form have each been supported rotatably via pin-shaped bearing elements 70 (FIG. 2). The pin-shaped bearing elements 70 have been arranged on the disc-shaped planet carrier 56 parallel to the axis of rotation.

In the centre of the planet carrier 56 the first gearing shaft 52 has been mounted in torsionally resistant manner on the planet carrier 56. The first gearing shaft 52 is perpendicular to the upper side of the planet carrier 56 and extends with its longitudinal axis along the axis of rotation of the planet carrier 56. It is also conceivable that the first gearing shaft 52 has been formed with the planet carrier 56 as an integral component. The advantage of such an embodiment lies in the fact that a fastening of the first gearing shaft 52 to the planet carrier 56 is dispensed with.

The first gearing shaft 52 mounted in torsionally resistant manner on the planet carrier 56 has been provided for receiving the sun gear 36 and the output-side gearwheel 34, connected thereto to rotate with same, of the second gearing stage 14 on the planet carrier 56 in supporting manner. Consequently, the planet gears 54 and the sun gear 36 are jointly capable of being supported on the planet carrier 56, by virtue of which a clearance compensation between the sun gear 36 and the planet gears 54 becomes superfluous and the service life and efficiency of the planetary gearing are thereby increased.

On the underside of the planet carrier 56 an output element 58 has been positively fitted. The output element 58 is peg-shaped and has been arranged concentrically with the planet carrier 56. In the present embodiment the output element 58 has been received on the underside in a cylindrical bore along the axis of rotation of the planet carrier 56. In an alternative embodiment, the output element 58, the planet carrier 56 and the first gearing shaft 52 may have been integrally formed.

The arrangement and support of the three gearing stages 12, 14, 16 are effected with the aid of centring, fixing and holding elements 20, 40, 60. The holding element 60 is annular, with fastening elements 62 axially moulded onto the outside thereof. The holding element 60 has been shaped in such a manner that the planet carrier 56 is capable of being inserted into the holding element 60 in exactly fitting manner. The holding element 60 is fastened in latching manner to the outside of the ring gear 48 via the fastening elements 62.

The ring gear 48 has been formed at a second end of the fixing element 40. The ring gear 48 takes the form of an internally toothed gearwheel ring, whereby the upper side of the ring gear 48 has been covered in the form of a disc, and exhibits a cylindrical opening for passing the first gearing shaft 52 and the sun gear 36 through. The ring gear 48 consequently forms a part of the fixing element 40. In the present embodiment the fixing element 40 has been subdivided into two parts, namely into a ring gear 48 at the second end and into a cylindrically defined receiving space 44 at the first end. Between the cylindrical receiving space 44 and the ring gear 48 the second gearing shaft 46 has been formed on the upper side of the fixing element 40. The second gearing shaft 46 has been connected in torsionally resistant manner at its second end to the fixing element 40 or has been rotatably supported therein. The second gearing shaft 46 may have been integrally formed with the fixing element 40.

The mounting of the gearing device 7 on the fixing element 40 and centring element 20 begins with the insertion of the planet carrier 56 and the planet gears 54 resting rotatably thereon into the ring gear 48. In this connection the planet gears 54 are inserted into the ring gear 48 on the underside. The planet carrier 56 with the planet gears 54 is secured to the ring gear 48 with the holding element 60 to prevent it from falling out. The first gearing shaft 52 supported in torsionally resistant manner on the planet carrier 56 protrudes through the circular opening of the upper-side disc-shaped cover of the ring gear 48. Onto the first gearing shaft 52 the sun gear 36 and the output-side gearwheel 34, connected to the sun gear 36, of the second gearing stage 14 are subsequently attached. The sun gear 36 is introduced through the circular opening into the ring gear 48 until it rests on the planet carrier 56 and is in engagement with the planet gears 54. The sun gear 36 and gearwheel 34 connected thereto have been rotatably supported on the upper side of the planet carrier 56 via the first gearing shaft 52.

Subsequent to this, the drive-side gearwheel 32 of the second gearing stage 14 and the output-side gearwheel 30, connected thereto, of the first gearing stage 12 are attached onto the second gearing shaft 46, as a result of which both gearwheels have been rotatably supported on the fixing element 40, and gearwheel 32 is in engagement with gearwheel 34. Thereupon the centring element 20 is mounted on the fixing element 40, whereby the first gearing shaft 52 and the second gearing shaft 46 are inserted with their first end respectively into the corresponding bearings 26, 28 on the centring element 20. Finally, the drive-side gearwheel 18 of the first gearing stage 12 is inserted together with the drive device 10 into the gearing device 7.

The gearing device 7 described in the present embodiment is distinguished not only by a simple mounting but also by a robust support of the gearing components within the gearing device 7. The two gearing shafts 46, 52 have each been fastened or rotatably supported on both sides, whereby the first gearing shaft 52 has been supported at its first end on the centring element 20 and at its second end on the planet carrier 56, and the second gearing shaft 46 has been supported at its first end on the centring element 20 and at its second end on the fixing element 40. In this way, no 'unsupported bearing shafts' are present in the gearing device 7, as a result of which the robustness of the gearing device 7 increases.

The spatial position of the first gearing shaft 52 is determined uniquely via the planet gears 54 guided in the ring gear 48. In other words, the first gearing shaft 52 centres itself with respect to the ring gear 48 via the planet gears 54 resting rotatably on the planet carrier 56. The first gearing shaft 52 centred via the ring gear 48 can consequently be drawn upon by way of starting-point for a tolerance-appropriate positioning of the second gearing shaft 46, and also of the drive device 10, on the fixing element 40.

On the basis of the sectional view represented in FIG. 2, the geometrical arrangement of the subassembly 6 will finally be clarified. By virtue of the stepped design of the fixing element 40, the first gearing stage 12 and the second gearing stage 14 have been arranged offset relative to one another in the axial direction, whereby the output-side gearwheels 30, 34, which in each instance are larger in diameter, overlap in the radial direction. Furthermore, the drive device 10 has been arranged offset with respect to the gearing device 7 in the axial direction, so that a particularly compact subassembly 6 with a high gear-reduction ratio is formed.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. A subassembly of an electromechanical brake actuator comprising:
   a drive device for generating a torque;
   a gearing device which comprises, in succession, a first, a second and a third gearing stage for transmitting the torque, the second gearing stage taking the form of a toothed-wheel gearing, and the third gearing stage taking the form of a planetary gearing, and a planet carrier of the third gearing stage receiving and connected with a first gearing shaft for a sun gear of the third gearing stage and an output-side gearwheel, coupled to rotate with the sun gear, of the second gearing stage, and also bearing elements for planet gears of the third gearing stage.

2. The subassembly according to claim 1, wherein the first gearing stage takes the form of a toothed-wheel gearing or belt gearing.

3. The subassembly according to claim 2, wherein a drive-side gearwheel of the second gearing stage has been coupled to rotate with an output-side gearwheel or belt pulley of the first gearing stage.

4. The subassembly according to claim 1, wherein the sun gear of the third gearing stage and the output-side gearwheel of the second gearing stage have been integrally formed.

5. The subassembly according to claim 1, wherein the first gearing shaft has been arranged in a torsionally resistant manner on the planet carrier.

6. The subassembly according to claim 1, wherein the first gearing shaft has been provided centrally on the planet carrier.

7. The subassembly according to claim 1, wherein the planet carrier exhibits, on a side situated opposite the planet gears, an output element, fitted to the planet carrier in a torque-transmitting manner, for delivering the torque.

8. The subassembly according to claim 3, further including a fixing element which has been provided for arranging the gearing device spatially relative to the drive device.

9. The subassembly according to claim 8, wherein the first gearing shaft has been supported on the fixing element.

10. The subassembly according to claim 8, wherein a ring gear for receiving the planet gears has been formed on the fixing element.

11. The subassembly according to claim 10, wherein the planet carrier of the third gearing stage has been supported on the ring gear via a holding element.

12. The subassembly according to claim 8, wherein the fixing element is stepped.

13. The subassembly according to claim 8, wherein a second gearing shaft has been received in a supporting manner on the fixing element.

14. The subassembly according to claim 8, further including a centring element which, together with the fixing element, forms a cage-like receiving space for the gearing device.

15. The subassembly according to claim 14, wherein the second gearing shaft has been supported at a first end on the fixing element, and at a second end on the centring element.

16. The subassembly according to claim 15, wherein the drive-side gearwheel of the second gearing stage and the output-side gearwheel of the first gearing stage have been received via the second gearing shaft in the cage-like receiving space between the fixing element and the centring element.

17. An electromechanical brake actuator, comprising a subassembly according to claim 1, a housing and at least two cushioning elements, wherein the at least two cushioning elements have been arranged between the subassembly and the housing for the purpose of cushioning support of the subassembly in the housing.

18. An electric parking brake, including a subassembly according to claim 1 or an electromechanical brake actuator according to claim 17 and a rotation/translation converter connected downstream of the brake actuator for transforming the rotational motion generated by the brake actuator into a linear motion.

* * * * *